United States Patent [19]

Matsumura et al.

[11] Patent Number: 4,828,592

[45] Date of Patent: * May 9, 1989

[54] POLARIZATION PLANE MAINTAINING OPTICAL FIBER FABRICATING METHOD

[75] Inventors: Hiroyoshi Matsumura, Iruma; Toshio Katsuyama, Hachioji; Tsuneo Suganuma, Tokorozawa, all of Japan

[73] Assignee: Hitachi, Ltd., Tokyo, Japan

[ * ] Notice: The portion of the term of this patent subsequent to Jan. 17, 2001 has been disclaimed.

[21] Appl. No.: 883,456

[22] Filed: Jul. 8, 1986

Related U.S. Application Data

[63] Continuation of Ser. No. 380,759, May 21, 1982, abandoned.

[30] Foreign Application Priority Data

May 29, 1981 [JP] Japan ................................ 56-77238
Jul. 20, 1981 [JP] Japan ............................... 56-112137

[51] Int. Cl.$^4$ ............................................. C03C 25/02
[52] U.S. Cl. ....................................... 65/3.11; 65/3.12
[58] Field of Search ................... 65/3.11, 3.12, 18.2; 350/96.31

[56] References Cited

U.S. PATENT DOCUMENTS 4,179,189 12/1979 Kaminow et al. ................... 65/3.11
4,184,859 1/1980 Maklad ........................... 65/3.12 X
4,274,854 6/1981 Pleibel et al. ....................... 65/3.11
4,426,129 1/1984 Matsumura et al. ............. 65/3.12 X

FOREIGN PATENT DOCUMENTS 1501586 2/1978 United Kingdom ................ 65/3.12
2012983 8/1979 United Kingdom .

Primary Examiner—Kenneth M. Schor
Assistant Examiner—Michael K. Boyer
Attorney, Agent, or Firm—Antonelli, Terry & Wands

[57] ABSTRACT

An optical fiber having an intense polarization plane maintenability is constructed of an optical waveguide having a circular core and a circular cladding, a jacket formed on the outer circumference of the optical waveguide and having an elliptical outer circumference, and a supporting portion formed on the jacket.

In order to fabricate the above-specified optical fiber, a preformed rod therefor is prepared by forming the inner wall of an silica glass tube with the jacket and the optical waveguide made of such materials as satisfy a relationship of $c_2/a \geq 200/(100-\gamma)-1$, wherein: letter $\gamma$ stands for the ellipticity of the outer circumference of the aforementioned jacket; letter $c_2$ stands for the minor axis of an ellipse; and letter $a$ stands for the radius of the circular optical waveguide, and by subsequently collapsing the aforementioned silica glass tube while having its internal pressure made lower than the atmospheric pressure by 1 to 20 mmH$_2$O.

8 Claims, 6 Drawing Sheets

POLARIZATION PLANE MAINTAINING OPTICAL FIBER FABRICATING METHOD

This application is a continuation of application Ser. No. 380,759, filed May 21, 1982 now abandoned.

BACKGROUND OF THE INVENTION (1) Field of the Invention

The present invention relates to a polarization plane maintaining optical fiber, and more particularly to both a circular optical fiber having an intense function to transmit optical waves by the use of a one-directional polarization, i.e., to maintain a polarization plane and a method of fabricating the same.

(2) Description of the Prior Art

In accordance with the progress in development of fibers optical fiber, it has been being developed to practice an optical circuit such as an optical isolator or an optical switching circuit by the use of an optical integrated circuit. The waveguide structure to be used in the optical integrated circuit is basically of the slab type, which is strengthened from the necessity that a light has to be polarized so as to practice the integrated circuit by the switching circuit. It is desired to effectively couple such optical integrated circuit to another optical device by means of a circular optical fiber. In this case, it is required that the optical fiber can maintain the polarization plane in a predetermined direction.

Moreover, it has been proposed to conduct a variety of measurements by making use of the polarization plane of the light. In order to provide those measurements, the transmission of the light while maintaining its polarization plane raises a problem to be solved. It is especially desired in view of the transmission efficiency in optical energy and the consideration of fabrication that the light be transmitted, while having its polarization plane maintained, by the use of a circular waveguide tube (i.e., the optical fiber) which has reached the practical stage at present.

As the circular optical fiber maintaining the polarization plane, there has been proposed according to the prior art an optical fiber which is constructed of a core, a cladding and a jacket and in which the jacket has such an irregular thickness as to induce a stress in the core so that an index difference (which will be referred to as a "strain birefringence") may be made equal to or higher than a predetermined level to maintain the polarization plane in the core in accordance with the difference in the mechanical stresses taken in the waveguide regions and along the transverse directions intersecting at a right angle (Reference should be made to "Birefringence in elliptically clad borosilicate singlemode fibers. APPLIED OPTICS/Vol. 18. No. 2415. Dec. 1979).

In order to maintain the polarization plane, specifically, the maintenance of polarization is intensified to a greater extent as the value L (which will be called a "coupling length") to be defined by the following Equation is decreased the smaller:

$$\frac{2\pi}{\Delta\beta} = L,$$

wherein the difference in the propagation constants between two orthogonally polarized fundamental modes is designated at $\alpha\beta$. If the core has a circular shape, therefore, the difference $\Delta\beta$ in the above-defined constants is determined by the difference $\Delta n$ in the refractive indexes for the two directions of polarization. Moreover, that difference $\Delta n$ in the refractive indexes is proportional to the difference in the strain in those two directions, which is caused by the difference in the thermal expansion coefficients between the jacket and the cladding.

In the proposal thus far described, however, as means for making the thickness of the jacket irregular, the jacket has to be deformed at an initial step so that its fabricating process is complicated. In reality, moreover, the coupling length L obtained is at least 10 mm.

We, the Inventors, have realized a polarization plane maintaining optical fiber (which is disclosed in Japanese Patent Application Nos. 55-1330, entitled "Polarization Plane Maintaining Singlemode Optical Fiber"), which is constructed of the aforementioned jacket, cladding and core, by adding $B_2O_3$ in a quantity equal to or more than a predetermined value to the cladding composed mainly of silicon dioxide and by slightly modifying the optical fiber fabricating method of the prior art.

However, since the glass having the $B_2O_3$ added thereto fails to have its relative index difference 0.7% more than the $SiO_2$ glass, the microbending loss is enlarged to invite another problem that it is impossible to provide an optical fiber of low loss. Moreover, in case the boric oxide ($B_2O_3$) contained in the cladding is too much, the absorption due to lattice vibrations for a longer wavelenth (e.g., longer than 1.2 $\mu$m) invites still another problem that the loss cannot be lower than 1 dB/Km for a wavelength which is intrinsically deemed as a low-loss region for the optical fiber of boro-silicate glass.

SUMMARY OF THE INVENTION

It is, therefore, an object of the present invention to provide an optical fiber in which such a difference $\Delta\beta$ between the propagation constants in the perpendicular directions of the optical axis of the fiber, that determines the polarization plane maintainability, has a high value and which fiber can be fabricated without difficulty. Another object of the present invention is to provide an optical fiber which has a low transmission loss but an intense polarization plane maintainability A further object of the present invention is to provide a method of preparing an optical fiber mother rod, which method comprises the step of forming on the inner wall of a circular silica glass tube a glass thin film made of a material different from at least that of the aforementioned glass tube, and the step of collapsing said glass tube to prepare such a solid optical fiber mother rod, i.e., a preform rod. This solid optical fiber mother rod is characterized in that it is constructed, without resorting to a polishing and grinding step and a step of deforming the initial glass tube, of a circular center layer, an intermediate layer formed on the outer circumference of said center layer and having an elliptical outer circumference, and an outermost layer formed on the outer circumference of said intermediate layer; and in that the ellipticity of the outer circumference of said intermediate layer can be arbitrarily set.

In order to achieve the above-specified objects, according to the present invention, there is provided an optical fiber which comprises an optical waveguide corresponding to the circular optical fiber known in the art, a jacket coaxially formed on said optical waveguide and having an elliptical outer circumference, and a supporting portion formed on the outer circumference of said jacket. According to the construction thus far described, if the refractive index of the jacket is set under a predetermined condition, all the optical energy is concentrated exclusively upon the optical waveguide, and the refractive indexes of the optical waveguide in the perpendicular optical axes are made different due to the strain stress by the elliptical jacket to establish the birefringence thereby to enlarge the phase propagation constant difference $\Delta\beta$ so that an optical fiber having an intense polarization plane maintainability can be put into practice. Especially because the jacket occupying quantitatively large portion of the material has a remarkably low distribution of the optical energy, there is no need for taking the optical transmission loss into consideration so that the fabrication of the optical fiber can be facilitated.

According to the present invention, moreover, there is provided a method of fabricating an optical fiber including the steps of forming a glass thin film on the inner wall of a glass tube acting as a substrate; heating and crushing one end of the tube formed with the aforementioned glass thin film; and by gradually moving the heated portion from said crushed one end, while rotating said glass tube having said crushed one end, said glass tube having maintained therein a pressure lower than atmospheric pressure, to solidify said glass tube thereby to fabricate a solid optical fiber mother rod (i.e., a preform), which method is characterized in that, said intermediate layer is partially made of a material having a lower softening point than that of said glass tube providing said substrate whereas said core is made of a material having a higher softening point than said material having said lower softening point, so that said preform rod may have such a sectional structure as to be constructed of a circular center layer, an intermediate layer having an elliptical outer circumference and an outermost circumferential layer having a circular or quasi-circular shape.

Incidentally, the center layer and the intermediate layer need not be limited to such a single layer as will be described hereinafter in the embodiment of the present invention but may be composed of a plurality of sublayers. On the other hand, the ellipsoid is so defined in the present invention as to be one which has an ellipticity of $$\gamma\left(\frac{C_1 - C_2}{C_1 + C_2} \times 100\right)$$

higher than 3%, wherein the major and minor axes of the ellipse are designated at $C_1$ and $C_2$, respectively, and the ellipsoid having a lower ellipticity is defined to be a circle.

According to the method of the present invention, a highly reproducible optical fiber mother rod, in which the optical waveguide has a circular shape and in which the intermediate layer has an arbitrary ellipticity can be made by fixing the radius and thickness of the tube, the inner pressure and the glass materials of the glass thin films.

Especially if the center layer is circular and the intermediate layer is elliptical, the refractive indexes of the center layer in the perpendicular axial directions can be made different without any difficulty so that an optical fiber facilitated to maintain the polarization plane can be practised.

Incidentally, the final optical fiber having a sectional construction similar to the aforementioned one can be easily practiced merely by drawing, while heating, the preform rod which has been prepared by the aforementioned method.

Additional objects and features of the present invention will become apparent from the following description, in which preferred embodiments will be set forth in detail in conjunction with the accompanying drawings.

DESCRIPTION OF THE PREFERRED EMBODIMENTS

Figure 1:
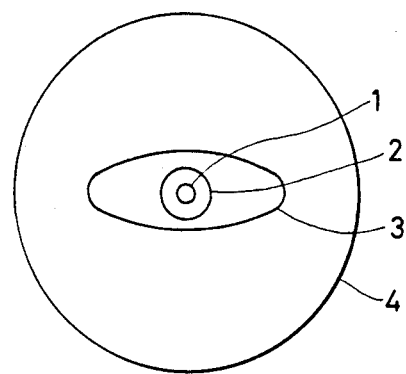
FIG. 1 is a view showing the sectional construction of an optical fiber according to the present invention.

FIG. 1 shows the sectional construction of one embodiment of an optical fiber according to the present invention. As shown, the optical fiber is constructed to include: a circular core 1; a circular cladding 2 which is formed concentrically of the aforementioned core; a jacket 3 which is formed on the outer circumference of the aforementioned cladding and which is made to have an elliptical outer circumference; and a supporting portion 4 which is formed on the outer circumference of the aforementioned jacket. The optical refractive indexes of the aforementioned respective layers are set, as illustrated in FIG. 2, such that only the core 1 has the highest value whereas the remaining layers have a substantially equal value.

In order to achieve the refractive index distribution thus far described, the core 1 may desirably be made of $SiO_2$ glass (i.e., boric oxide glass) containing germanium dioxide and/or phosphorous pentoxide. This is because dopants of those two components have low optical transmission losses. However, the dopants of the core should not be limited to germanium dioxide or the phosphorous pentoxide. The dopants are not especially limited but may be antimony pentoxide or aluminum oxide, for example, if the latter has a higher refractive index than the $SiO_2$ glass. Moreover, even a dopant such as boric oxide having a lower refractive index than the $SiO_2$ glass can naturally be used if it is used together with another dopant having a higher refractive index than the $SiO_2$ glass.

Next, the desired material for the cladding 2 is the SiO₂ glass. The absorption loss of the SiO₂ glass is so low that the transmission loss of the optical fiber can be reduced if the cladding is made of the SiO₂ glass. As the material making the elliptical jacket 3, on the other hand, there is desired the material which is prepared by adding the germanium dioxide or phosphorous pentoxide enhancing the refractive index to the SiO₂ glass containing the boric oxide so that the refractive index of the elliptical jacket 3 may be identical to those of the cladding 2 and the support 4, as illustrated in FIG. 2. As the material for that elliptical jacket, there may be another material which is prepared by using the SiO₂ glass having an additional fluoride compound as a substrate and by adding thereto the germanium dioxide, the phosphorous pentoxide or the like. In short, the material for the jacket is not especially limited if it has a large difference in the thermal expansion coefficient from the support 4 and which has a refractive index equal to that of the cladding 2 and the support 3. As the material making the support 4, on the other hand, the SiO₂ glass is desired because it enlarges the thermal expansion coefficient difference from the elliptical jacket 3 and in view of a problem in its fabrication.

Figure 2:
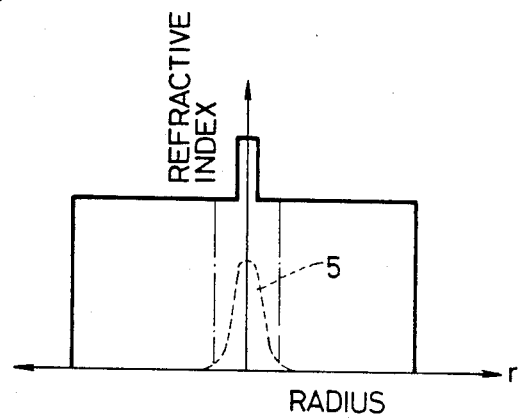
FIGS. 2, 3 and 4 illustrate refractive indexes of optical fibers according to the present invention.

Now, if the optical fiber has the construction of the aforementioned embodiment, the aforementioned core 1 and cladding 2 form the optical waveguide so that the optical energy is almost concentrated at the optical waveguide, as indicated at a broken line 5 in FIG. 2. Therefore, no consideration is taken especially into the materials for the jacket 3 and the supporting portion 4 in view of the transmission loss. Since it is sufficient that the jacket may be selected with a view to establishing a high birefringence in the aforementioned core, the fabrication can be made remarkably advantageous. Specifically, since the optical waveguide and the birefringent portion are independent of each other, the distribution of the refractive index in the vicinity of the core can be changed without deterioration the birefringence. Moreover, there can be attained the degree of freedom for setting the refractive index of the optical waveguide, as will be described hereinafter.

Incidentally, the foregoing embodiment is directed to the case in which the output circumference of the support is circular. The polarization plane maintaining optical fiber has its polarization plane maintained only when only the linearly polarized light polarized in the direction of its optical axis is excited. Therefore, as is apparent without conducting any measurement for locating the optical axis (which corresponds to the major and minor axes of the elliptical jacket, in the case of the present optical fiber), the outer circumference of the present support 4 may be made elliptical similarly to the elliptical jacket so that the major and minor axes of the elliptical jacket can be known from the outside. However, if the recognition of the optical axis can be made without making the support elliptical, it is unnecessary to elaborately make the support elliptical.

Figure 3:
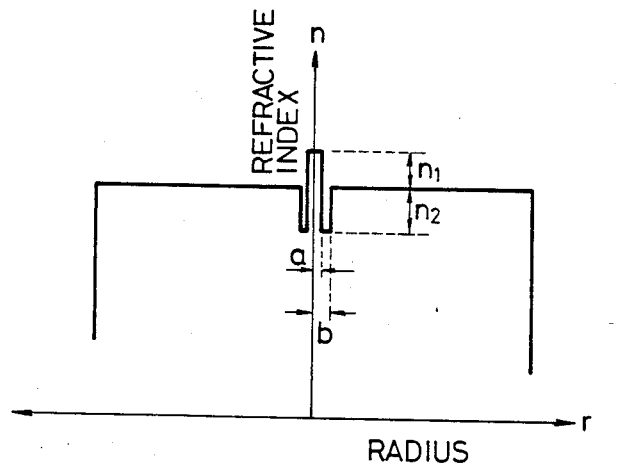
Figure 4:
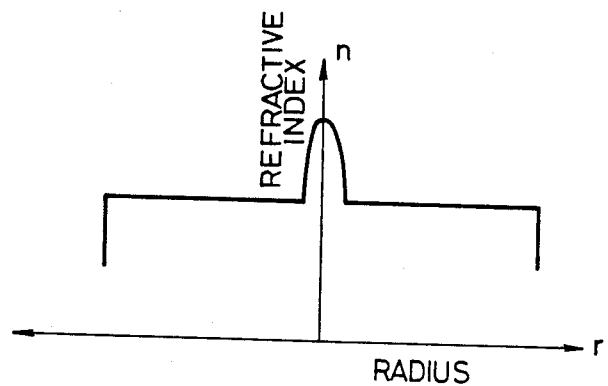

FIGS. 3 and 4 illustrate the distributions of the refractive indexes of other embodiments of the optical fiber according to the present invention, which are taken in the sectional direction thereof.

Since the optical waveguide and the jacket or the supporting portions are optically independent of each other, as has been described in connection with the foregoing embodiment of FIG. 1, the optical waveguide is not limited to that shown in FIG. 1. In the case of FIG. 3, the core has the highest refractive index, and a portion of the cladding is made to have a lower refractive index than that of the jacket so that the loss or the disturbance in the polarization plane, in case the optical fiber is bent for use, is reduced. The embodiment of FIG. 4 is so constructed that the optical waveguide has the so-called "graded index distribution", in which the refractive index is gradually reduced from the center to the outside, and that the jacket has a refractive index equal to the minimum of the aforementioned optical waveguide. It is natural that the outer circumference of the jacket is elliptical similarly to the aforementioned concept and that the refractive index of the waveguide establishes the birefringence.

Specific examples of the present invention will be described in the following.

EXAMPLE 1

On the inner wall of a silica tube (which has an external diameter of 18 mmφ and an internal diameter of 15 mmφ), there were consecutively deposited SiO₂-GeO₂-B₂O₃ glass, SiO₂ glass and SiO₂-GeO₂ glass by the CVD method. Subsequently, that tube was collasped, while having its internal pressure reduced—8 mm H₂O lower than the atmospheric pressure, to fabricate an optical fiber which was constructed of a circular core made of the SiO₂-GeO₂ glass, a cladding made of the SiO₂ glass, an elliptical jacket made of the SiO₂-GeO₂-B₂O₃ glass, and a support made of the SiO₂ glass. In the optical fiber thus fabricated, the core, the cladding and the elliptical jacket had refractive indexes of 1.004n, 1.00n and 0.999n, respectively, in case the refractive index of the core is indicated at the letter n. The core and the cladding had radii of 8 μm and 20 μm, respectively. The elliptical jacket had a major axis of 100 μm and a minor axis of 35 μm. The radius of the support was 150 μm. The extinction ratio of the optical fiber at 500 m for a wavelength of 0.633 μm (i.e., the optical power ratio at the emanating ends between the optical axis in the direction of an incident light and the other optical axis in case a linearly polarized light was incident in one optical axis) was 35 dB, and the transmission loss for a wavelength of 1.55 μm was 0.5 dB/Km. As a result, it was possible to provide an optical fiber which had a low transmission loss and which was excellent in the polarization plane maintainability.

EXAMPLE 2

An optical fiber having such a refractive index distribution as is shown in FIG. 3 was fabricated by a method similar to that of the Example 1. In the optical fiber thus fabricated, cores 2a and 2b had radii of 12 μm and 16 μm, respectively, and the cladding had a radius of 30 μm. The refractive indexes $n_1$ and $n_2$ of the core were 1.003n and 0.997n, respectively, in case the refractive index of the support is indicated as letter n. The remaining parameters were identical to those of the Example 1. The core portion I was made of SiO₂-GeO₂ glass, and the core portion II was made of SiO₂-B₂O₃ glass. The extinction ratio of the present optical fiber at 500 m was 30 dB for the wavelength of 0.633 μm, and the transmission loss was 0.9 dB/Km for the wavelength of 1.55 μm.

EXAMPLE 3

An optical fiber having such a refractive index distribution as is shown in FIG. 4 was fabricated by a method similar to that of the Example 1. The core radius, the cladding radius and materials of the optical fiber were identical to those of the Example 1, and the refractive index of the core was 1.006n at the center portion. The extinction ratio of that optical fiber for the wavelength of 0.633 μm was 36 dB, and the transmission loss was 0.4 dB/Km for the wavelength of 1.55 μm.

EXAMPLE 4

An optical fiber was fabricated by a method identical to that of the Example 1, and the transmission loss and the polarization plane maintainability were compared for different materials for the core. The remaining parameters and materials were similar to those of the Example 1. The experimental results are tabulated in the following Table:

| Core Materials | Extinction Ratio (500 m, 0.633 μm) | Transmission Loss (1.55 μm) |
|---|---|---|
| $SiO_2$—$P_2O_5$ | 31 dB | 2.1 dB/Km |
| $SiO_2$—$P_2O_5$—$GeO_2$ | 34 dB | 1.5 dB/Km |
| $SiO_2$—$B_2O_3$—$GeO_2$ | 39 dB | 3.1 dB/Km |
| $SiO_2$—$B_2O_3$—$P_2O_5$ | 34 dB | 4.0 dB/Km |

EXAMPLE 5

Figure 5:
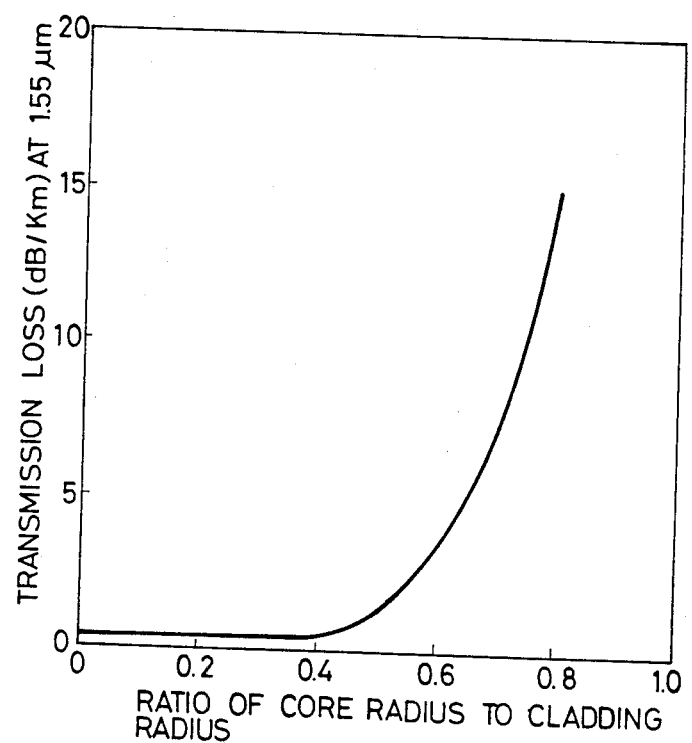
FIG. 5 illustrates the relationship between the ratio of a core radius to a cladding radius and the transmission loss.
Figure 6:
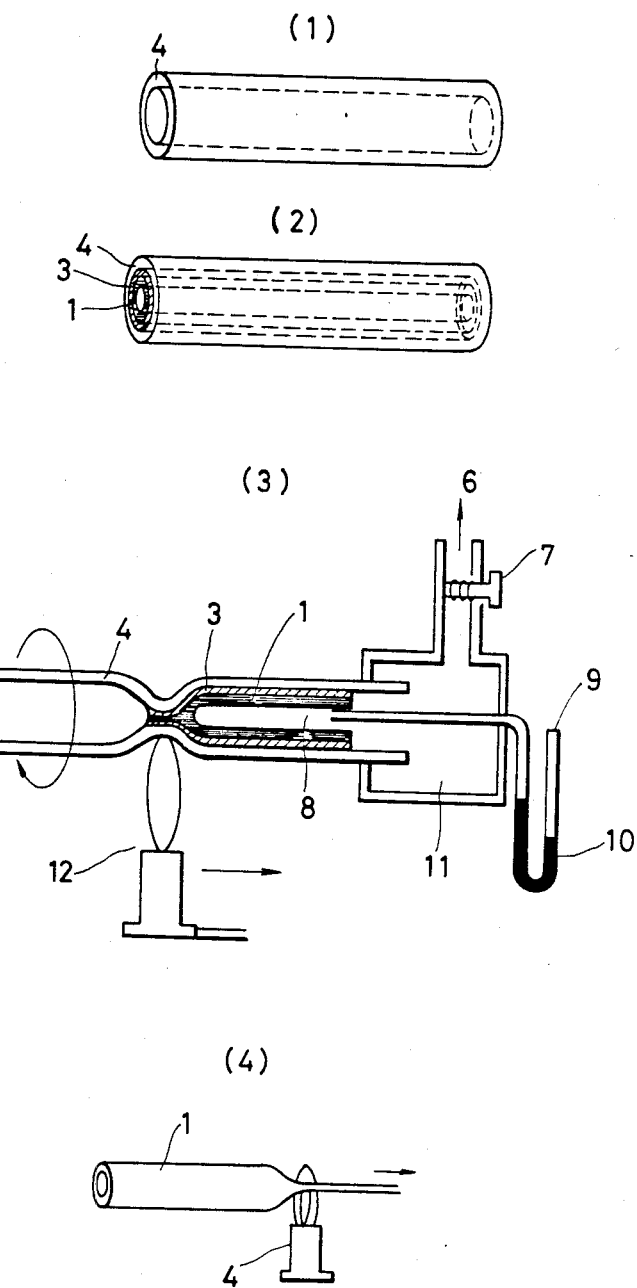
FIG. 6 shows the steps of a method of fabricating an optical fiber according to the present invention.

The transmission losses were compared for different core radii and different cladding radii using the same method and materials as those of the Example 1. In this case, if the ratio of the core radius to the cladding radius is decreased, the influences of the transmission loss by the elliptical jacket can be reduced more. In FIG. 5 illustrating the experimental results, the abscissa indicates the ratio of the core radius to the cladding radius, and the ordinate indicates the transmission loss for the wavelength of 1.55 μm. In order to reduce the transmission loss to a level lower than 1 dB/Km, it is understood in view of FIG. 5 that the ratio of the core radius to the cladding radius has to be reduced to a value less than one half.

EXAMPLE 6

There was fabricated an optical fiber in which the outer circumference of a support was formed into an ellipse having an ellipticity of 10% and in which the axis thereof was in the same direction as that of an elliptical jacket. The optical fibers thus fabricated were coupled. Then, since the outer circumference of the support was elliptical, the axis could be easily located so that the two optical fibers could be coupled while having their axes offset within a discrepancy of 0.5 degrees.

Next, the method of preparing the foregoing optical fiber mother rod will be described hereinafter.

(1) First of all, the silica glass tube 1 acting as the substrate of an optical fiber is prepared. In case that glass tube has a large radius but a small thickness, it is difficult to obtain a predetermined shape at a subsequent pressure-reducing step (3). If necessary, therefore, there is included a step of reducing the radius. The glass tube may desirably have an external radius of 5 mm to 50 mm and a thickness of 0.3 mm to 5 mm.

(2) On the inner wall of the aforementioned glass tube 4, there are formed by the chemical vapor deposition (CVD) method the glass thin film 3 to provide the intermediate layer of the optical fiber and the glass thin film 1 to provide the center layer. The intermediate layer may have the function of the cladding or the functions of the jacket and the cladding of the optical fiber, as the case may be. On the other hand, the center layer may form either only the core or the core and the cladding (i.e., the optical waveguide) of the optical fiber, as the case may be.

Those materials and thicknesses will be described in more detail hereinafter.

(3) The glass tube having the glass thin films formed at the aforementioned step has both its ends clamped by a glass lathe (although not shown) and is rotated at a predetermined r.p.m. As shown, one end portion of the tube attached to a table is heated by an oxy-hydrogen burner 12 so that it may be collapsed. To the other open end portion of the glass tube, moreover, there is connected an exhausted tank 11, which is evacuated from an exhaust tube 6, while adjusting an exhaust control valve 7, so that the pressure in the tube may be reduced until it takes a predetermined level. The pressure reduction is metered in terms of the difference in the levels of a liquid 10 by means of a U-tube 9 which has its one end inserted in the inside 8 of the silica glass tube. At this state, the heat source (i.e., the burner) 12 is gradually moved to prepare a solid preform. The degree of the pressure reduction is set at about 1 mmH$_2$O to 30 mmH$_2$O.

(4) The preformed rod is melted by means of the oxy-hydrogen burner 12 and is drawn in one direction. Then, an optical fiber having an elliptical intermediate layer is realized.

Figure 7:
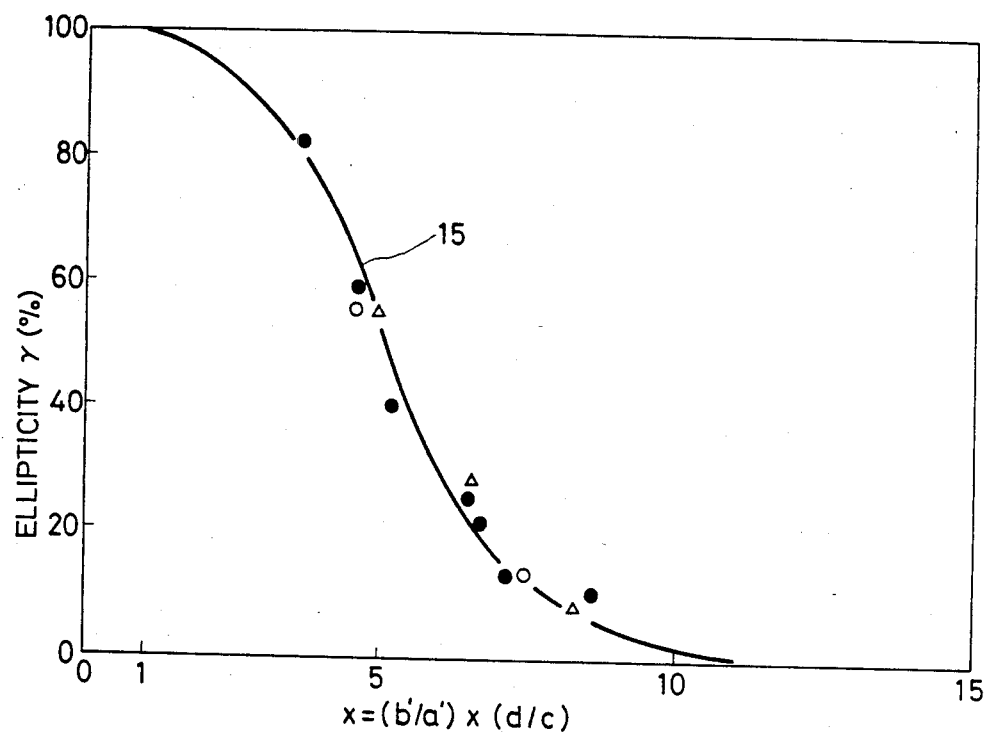
FIG. 7 illustrates the relationship between the thicknesses of the layers of which an optical fiber mother rod is constructed and the ellipticity of an elliptical layer.
Figure 8:
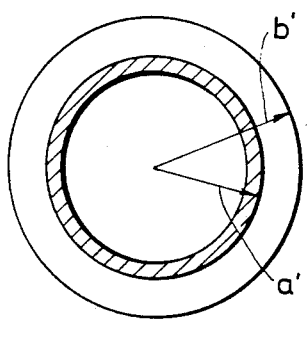
FIGS. 8 and 9 are sectional views showing a glass tube and a preform for explaining FIG. 7, respectively.
Figure 9:
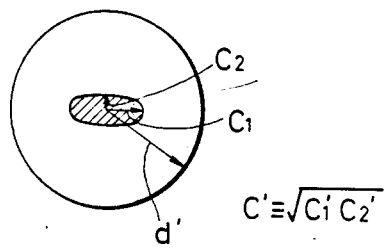

FIG. 7 illustrates the relationship between the ellipticity of the inner circumference (i.e., the outer circumference of the center or intermediate layer) of the outermost layer of the preformed rod, which was prepared by the method of the present invention, and the thicknesses of the respective layers before and after the solidification. The ordinate indicates the ellipticity of the elliptical layer of the preform, and the abscissa indicates a product of (b'/a')×(d'/c'), in which letters b', a', d' and c' indicate the external radius of the silica glass tube before collapsing, the internal radius of the same, the external radius of the preform, and the average diameter ($=\sqrt{c_1 \cdot c_2}$) of the elliptical layer, respectively, as shown in FIGS. 8 and 9. The fabricating conditions are such that the collapsing temperature is 1800° C., the pressure reduction 8 mmH$_2$O, the burner speed of the oxy-hydrogen burner 0.8 mm/sec, and the glass thin film is made of silica glass containing GeO$_2$ and B$_2$O$_3$ as dopants. Black circles, white circles and white triangles appearing in FIG. 7 are plotted for the initial silica tube radii of 14, 18 and 20 mm, respectively.

In view of FIG. 7, it is found that the ellipticity γ is expressed by the following Equation:

$$\left. \begin{array}{l} \gamma = 100 e^{-A(x-1)^2} \, [\%] \\ x = (b'/a') \times (d'/c') \end{array} \right] \quad (1)$$

Figure 10:
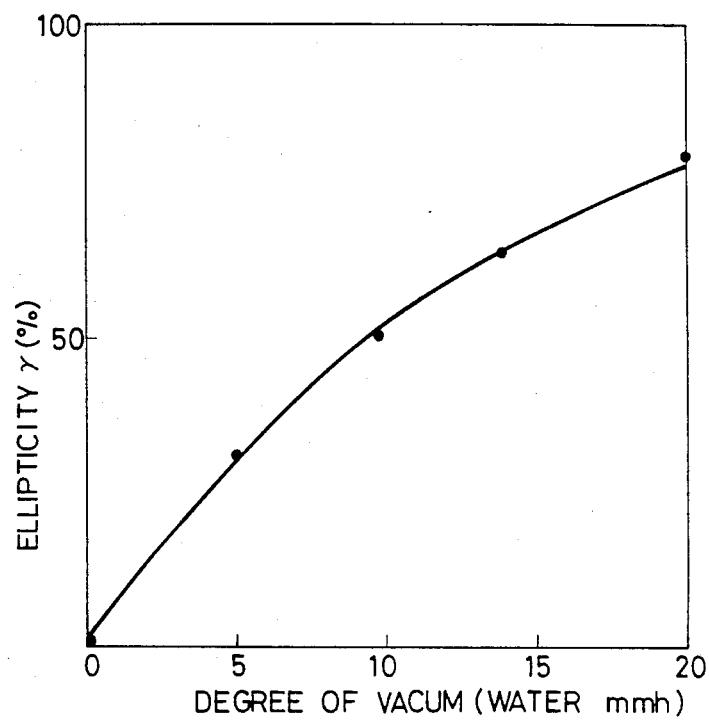
FIG. 10 illustrates the relationship between the degree of the vacuum in the glass tube and the ellipticity of the elliptical layer.

The aforementioned Equation (1) holds even if the collapsing temperature (1700° to 2000° C.), the burner speed (0.02 to 0.2 mm/sec) of the heat source 12, and the composition of the deposited glass are changed within such ranges as are practically used in the fabrication of the optical fiber. Moreover, letter A appearing in the aforementioned Equation (1) designates a constant which is determined by the degree of the pressure reduction, and FIG. 10 illustrates the relationship between the aforementioned ellipticity and the degree P of the pressure reduction, which is experimentally determined. From the same Figure, the constant A is determined by the following Equation:

$$A = 0.344/P \tag{2}$$

In order to prepare a preformed rod formed with an elliptical layer having a predetermined ellipticity $\gamma$, therefore, if a silica glass tube is used as the substrate and if the collapsing temperature and the burner speed of the heat source are 1700° to 2000° C. and 0.02 to 0.2 mmH$_2$O, respectively, the pressure reduction degree P and the radii and thicknesses of the respective layers may be set on the basis of the following Equations:

$$\gamma = 100 e^{-\frac{0.344}{P}(x-1)^2}; \tag{3}$$

and $$x = (b'/a') \times (d'/c'). \tag{4}$$

Incidentally, in case the deposited glass layers are sufficiently thinner than the silica glass tube even if they are not of one kind but plural layers, the above-identified Equations hold at all times.

One of the major advantages of the fabrication method of the present invention is that it is possible to easily provide an optical fiber mother rod which has such a layer construction in the preform section that the outermost layer is generally circular, that the intermediate layer has an elliptical outer circumference and that the center layer is generally circular, as shown in FIG. 1.

Thus, in order that the intermediate layer may have a larger ellipticity than the center layer, its material has a lower softening point than that of the core material. This is realized by adding B$_2$O$_3$ and SiO$_2$ to the material of the intermediate layer. The softening point becomes lower as the quantity of the B$_2$O$_3$ added is increased. In order to enlarge the difference in the thermal expansion coefficient, however, it is desired that the quantity of the dopant B$_2$O$_3$ be 3 mol% to 30 mol%. In order to make the center layer circular, moreover, the thickness of the glass thin film to be formed on the inner wall of the glass tube may be preset by the following Equation:

$$\frac{c_2}{a} \geq \frac{200}{100 - \gamma} - 1, \tag{5}$$

wherein: the letter $\gamma$ designates the ellipticity of the intermediate layer of the preformed mother rod; letter $c_2$ designates the length of the minor axis of ellipse of the aforementioned intermediate layer; and letter a designates the radius of the center layer.

These requisites are due to the following reasons. When the glass tube formed with the glass thin films is collapsed while having a reduced internal pressure, the temperature gradient is initially higher at the outer side. Because of the thickness of the tube, on the other hand, the outer side is little influenced by the pressure reduction so that the circular shape is to be maintained mainly by the surface tension. The inner side is dominated mainly by the pressure reduction degree so that it is to be flattened. If the heating treatment further continues, the inner side has its temperature so raised that it is liable to be deformed. As a result, the tube contacts, while being flattened by the pressure reducing operation, to reduce the hollow portion. In this manner, the intermediate layer having a lower softening temperature has its viscosity gradually lowered. As a result, when the hollow portion disappears, the center layer is floating in the intermediate layer having its viscosity lowered. Since, at this time, the center portion has its pressure not reduced any more, the center layer is forced to be a circular shape mainly by the surface tension. During the cooling process, moreover, the solidification is effected such that the intermediate layer is filled in a clearance between the ellipse formed inside of the aforementioned initial silica tube and the circular core at the center.

As the factors for determining those shapes, therefore, whether or not the center layer is liable to become circular is considered to be determined by the softening point and viscosity of the intermediate layer during the collapsing treatment, the relationship between the relative thicknesses of the intermediate and center layers, and the relationship of the ellipticity of the inner circumference of the outermost layer (accordingly the outer circumference of the intermediate layer).

First of all, the condition for making the outer circumference of the intermediate layer elliptical is determined by the condition of the foregoing Equation (1).

Next, in order that the ellipticity $\gamma$ of the center layer may become smaller than that of the outer circumference of the intermediate layer, namely, that the center layer may become more circular, it is necessary that the center layer be made liable to freely become stably circular in the softened intermediate layer during the solidifying process upon the collapsing operation because of the aforementioned reason. For this necessity, it is sufficient that the following inequalities be satisfied:

$$\alpha_1 > \alpha_2; \text{ and } \alpha_3 > \alpha_2 \tag{6},$$

wherein letters $\alpha_1$, $\alpha_2$ and $\alpha_3$ designate the softening temperatures of the center, intermediate and outermost layers, respectively. In order to satisfy the above conditions, it is desired that the outermost layer be made of silica glass, that the center portion be made of glass containing SiO$_2$ or containing SiO$_2$ and a dopant such as GeO$_2$ or P$_2$O$_5$ because it is required to have a high refractive index, and that the intermediate layer be made of SiO$_2$ containing 3 mol% to 30 mol% of B$_2$O$_3$ as a dopant. Moreover, it is experimentally confirmed that the ellipticity of the intermediate layer and the difference of the materials in the intermediate and center layers in addition to the aforementioned softening points exert influences upon the improvement in the circularity of the center layer and that there exist a predetermined relationship among those factors.

Figure 11:
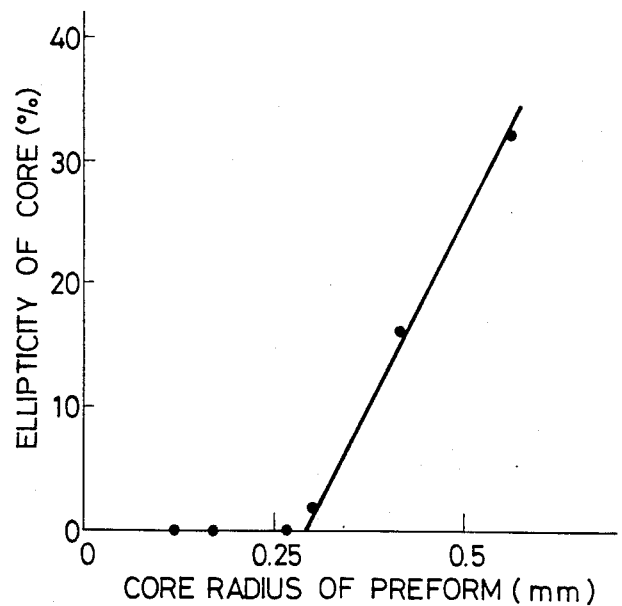
FIG. 11 illustrates the relationship between the core radius of the preform prepared by the method of the present invention and the core ellipticity.

FIG. 11 illustrates the ellipticities of the intermediate layer and the center layer (i.e., the core) in case there were formed by the CVD method on the inner wall of a silica glass tube (which has an internal radius of 6.7 mm and an external radius of 12 mm) a glass thin film containing 17 mol% of B$_2$O$_3$ and 83 mol% of SiO$_2$ and having a thickness of 150 $\mu$m to provide the cladding (i.e., the intermediate layer), and then a glass thin film containing 100 mol% of SiO$_2$ and having its thickness $\times [\mu m]$ varied to provide the core (i.e., the center layer) and in case the tube was then collapsed for solidification under a pressure reduction degree of 10 mmH$_2$O. In this case the ellipticity of the intermediate layer (i.e., the cladding) is 45%. Incidentally, the core radius in FIG. 11 indicates the radius in the case of the preformed rod. In case the ellipticity is made constant, specifically, it is understood that the ellipticity of the center layer (i.e., the core) is determined by the relative ratio of the thickness of the intermediate layer to the thickness of the center layer.

Figure 12:
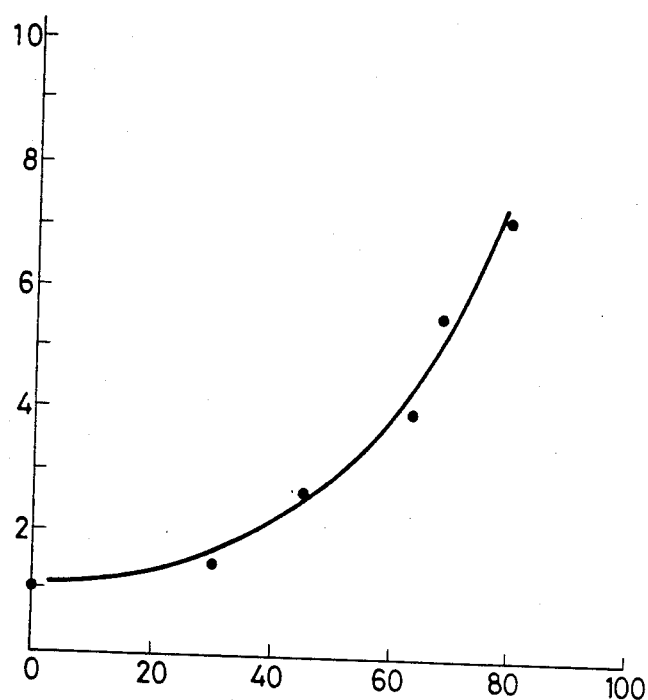
FIG. 12 illustrates the relationship between the ratio of the minor axis of the cladding to the core radius of the preform according to the present invention and the ellipticity of the cladding.

FIG. 12 illustrates the experimentally determined ratio of the minor axis of the intermediate layer (i.e., the cladding) to the radius of the center layer (i.e., the core) when the ellipticity of the intermediate layer is changed, as shown in FIG. 11, and when the ellipticity of the center layer becomes less than 5%. In FIG. 12, the abscissa indicates the ellipticity of the outer circumference of the cladding, and the ordinate indicates the ratio of $c_2/a$ of the minor axis $c_2$ of the cladding to the radius a of the core. From these measurement results, it is found that the relationship can be expressed by the following Equation at the boundary at which the core becomes circular:

$$\frac{c_2}{a} = \frac{200}{100 - \gamma} - 1.$$

Therefore, if the term $c_2/a$ is larger than the term $200/(100-\gamma)-1$, the core is naturally liable to become circular by the surface tension. Therefore, when the ellipticity of the intermediate layer is set at $\gamma$, and when the thickness, radius and pressure reduction degree of the silica glass tube are set, it is sufficient for making the center layer circular that the thickness of the layers of the glass thin films by the CVD method be so set as to satisfy an inequality of $c_2/a \geq 200/(100-\gamma)-1$ at the preformed state.

Next, specific examples of the fabrication method according to the present invention will be exemplified in the following:

EXAMPLE 7

On the inner wall of a silica glass tube (which had an external diameter of 18 mm$\phi$ and an internal diameter 15 mm$\phi$), there was deposited a glass thin film of $SiO_2$-$B_2O_3$-$GeO_2$ in 50 $\mu$m (That deposition corresponds to the external diameter ($2d'$) 7 mm$\phi$ and the average diameter ($2c'$) 3.1 mm$\phi$ of the deposited glass layer after the collapsing treatment. Incidentally, since fine powders of silica are caused to scatter from the outer wall of the silica tube by the heating treatment during the collapsing operation, the external diameter of the preform is made slightly small.). In order to have the ellipticity $\gamma$ of the deposited glass layer at 50%, the pressure reduction degree of 8 mm $H_2O$ and x=5.0 were attained by using the Equation (1). As a result, the ellipticity $\gamma$=50% was obtained for $b'/a' = 5.0 \times 3.1/7 = 2.21$. A preform having an intermediate layer of the ellipticity of 51% was prepared as a result of the collapsing operation with $2a'$ (i.e., the internal diameter of the tube before the collapsing operation)=5.1 mm$\phi$ and $2b'$ (i.e., the external diameter of the tube before the collapsing operation)=11.2 mm$\phi$.

EXAMPLE 8

On the inner wall of the silica glass tube (which had the external diameter of 18 mm$\phi$ and the internal diameter of 15 mm$\phi$), there were consecutively deposited by the CVD method glass containing 15 mol% of $B_2O_3$ and 85 mol% of $SiO_2$ in 180 $\mu$m and glass containing 100 mol% of $SiO_2$ in 3.5 $\mu$m. Then, the tube was heated to form a silica glass tube having an internal radius of 5 mm and an external radius of 11 mm. Subsequently, the tube was collapsed, while having its internal pressure reduced to a lower level than the atmospheric pressure by 8 mmH$_2$O, to prepare a preformed rod. The preformed rod thus obtained had an external diameter of 9.9 mm$\phi$, in which the core was a circular shape having a diameter of 10.3 mm$\phi$ and in which the cladding was an ellipse having an ellipticity of 40% and a minor axis of 1.5 mm$\phi$.

EXAMPLE 9

On the inner wall of the same silica glass tube as that of the Example 8, there were consecutively deposited by the CVD method glass containing 15 mol% of $B_2O_3$ and 85 mol% of $SiO_2$ in 180 $\mu$m, glass containing 100 mol% of $SiO_2$ in 3.2 $\mu$m, and glass containing 4 mol% of $GeO_2$ and 96 mol% of $SiO_2$ in 0.3 $\mu$m. After that, the silica glass tube was heated to form a silica glass tube having an internal diameter of 5 mm$\phi$ and an external diameter of 11 mm$\phi$. Then, the tube was collapsed, while having its internal pressure reduced to the lower level than the atmospheric pressure by 8 mmH$_2$O, to prepare a solidified preformed rod. The preformed rod thus obtained had an external diameter of 9.9 mm$\phi$, in which the $SiO_2$ layer and the $SiO_2$+$GeO_2$ layer of the center portion were concentrically circular shapes having radii of 0.32 mm and 0.095 mm, respectively, and in which the outer circumference of the $SiO_2$+$B_2O_3$ layer had an ellipticity of 27%.

What is claimed is:

1. An optical fiber mother rod fabricating method, said mother rod being used to obtain a polarization plane-maintaining optical fiber by drawing said mother rod into the fiber, comprising the steps of:
   (1) forming a first glass thin film having a lower softening point than that of silica glass on the inner wall of a silica glass tube and subsequently forming a second glass thin film having a higher softening point than that of said first glass thin film on the first glass thin film;
   (2) heating and collapsing said glass tube having said first and second glass thin films, under the conditions that the glass tube is rotated at a predetermined speed and the internal pressure of said glass tube is lower than the pressure outside of said glass tube, to thereby form a mother rod having a generally circular center layer and an intermediate layer having an elliptical outer circumference, said glass tube having a circular outer circumference, and having said first and second glass thin films, when heated and collapsed;
   wherein said first and second glass thin films each have a thickness such that the elliptical outer circumference of the intermediate layer and the circular central layer satisfy such a range as is expressed by the following equation:

$$\frac{C_2}{a} \geq \frac{200}{100 - \gamma} - 1$$

in which the letter $\gamma$ stands for the ellipticity of the elliptical outer circumference of the intermediate layer, formed from said first glass thin film, of the optical fiber mother rod material; the letter $C_2$ stands for the minor axis of the elliptical outer circumference of the intermediate layer; and the letter (a) stands for the radius of the circular center layer, formed from said second glass thin film, whereby a generally circular center layer can be achieved.

2. An optical fiber mother rod fabricating method as set forth in claim 1, wherein said internal pressure is lower than the atmospheric pressure by 1 mm $H_2O$ to 30 mm $H_2O$.

3. An optical fiber mother rod fabricating method according to claim 1, wherein said silica glass tube has a thickness of 0.3 mm to 5.0 mm and an external radius of 5 mm to 50 mm, and said internal pressure is lower than the atmospheric pressure by 1 mm $H_2O$ to 30 mm $H_2O$.

4. An optical fiber mother rod fabricating method as set forth in claim 1, wherein said first glass thin film is made of silica glass containing $B_2O_3$.

5. An optical fiber mother rod fabricating method according to claim 4, wherein said silica glass tube has a thickness of 0.3 mm to 5.0 mm and an external radius of 5 mm to 50 mm, and said internal pressure is lower than the atmospheric pressure by 1 mm $H_2O$ to 30 mm $H_2O$.

6. An optical fiber mother rod fabricating method as set forth in claim 4, wherein $B_2O_3$ is contained in the first glass thin film in an amount of 3 mol% to 30 mol%.

7. An optical fiber mother rod fabricating method as set forth in claim 1, wherein the glass tube is made of silica glass, said first thin film is made of $SiO_2$ containing 3 mol% to 30 mol% of $B_2O_3$, and said second glass thin film is made of glass containing $SiO_2$ or glass containing $SiO_2$ and dopants selected from the group consisting of $GeO_2$ and $P_2O_5$.

8. An optical fiber mother rod fabricating method as set forth in claim 1, wherein the first glass thin film and second glass thin film are formed by chemical vapor deposition.

* * * * *